(12) United States Patent
Mir et al.

(10) Patent No.: US 11,387,763 B2
(45) Date of Patent: Jul. 12, 2022

(54) MOTOR CONTROL SYSTEM, CONTROLLER, AND METHOD

(71) Applicant: EATON INTELLIGENT POWER LIMITED, Dublin (IE)

(72) Inventors: Sayeed A. Mir, Saginaw, MI (US); John D. Neely, Kentwood, MI (US); Stanley L. Seely, Byron Center, MI (US); John M. White, Elkton, VA (US)

(73) Assignee: Eaton Intelligent Power Limited, Dublin (IE)

(*) Notice: Subject to any disclaimer, the term of this patent is extended or adjusted under 35 U.S.C. 154(b) by 557 days.

(21) Appl. No.: 15/798,975

(22) Filed: Oct. 31, 2017

(65) Prior Publication Data

US 2019/0131909 A1 May 2, 2019

(51) Int. Cl.
| | | |
|---|---|---|
| H03K 5/00 | (2006.01) | |
| H02P 27/08 | (2006.01) | |
| H02P 6/28 | (2016.01) | |
| H02M 7/5395 | (2006.01) | |
| H02M 1/12 | (2006.01) | |
| H02M 1/14 | (2006.01) | |

(52) U.S. Cl.
CPC .......... *H02P 27/08* (2013.01); *H02M 7/5395* (2013.01); *H02P 6/28* (2016.02); *H02M 1/12* (2013.01); *H02M 1/14* (2013.01)

(58) Field of Classification Search
CPC .................................. H02P 27/08; H02P 6/28
USPC ..................................................... 318/400.13
See application file for complete search history.

(56) References Cited

U.S. PATENT DOCUMENTS

| | | | | |
|---|---|---|---|---|
| 6,101,112 A | * | 8/2000 | Suzuki | H02M 7/003 363/98 |
| 6,266,258 B1 | * | 7/2001 | Babinski | H02M 5/45 363/37 |
| 10,199,977 B1 | * | 2/2019 | Mohammadpour | H05K 1/181 |
| 2003/0052642 A1 | * | 3/2003 | Kerkman | H02P 27/08 318/801 |
| 2004/0114398 A1 | * | 6/2004 | Lipcsei | H02M 1/088 363/41 |
| 2005/0083116 A1 | * | 4/2005 | Risbo | H03F 3/217 330/10 |
| 2009/0049463 A1 | * | 2/2009 | Ueda | G11B 19/28 720/695 |
| 2013/0015889 A1 | * | 1/2013 | Kesler | H03K 17/168 327/109 |
| 2013/0187656 A1 | * | 7/2013 | Barrenscheen | H03K 17/28 324/415 |
| 2014/0254230 A1 | * | 9/2014 | Inomata | H02M 5/293 363/163 |
| 2015/0188462 A1 | * | 7/2015 | Soh | H02P 6/085 318/400.13 |

(Continued)

*Primary Examiner* — Eduardo Colon Santana
*Assistant Examiner* — Gabriel Agared
(74) *Attorney, Agent, or Firm* — Merchant & Gould P.C.

(57) ABSTRACT

A method of controlling an electric motor includes determining a PWM control signal, analyzing the PWM control signal to determine if components of the PWM signal are within a threshold amount of each other, applying duty-cycle blanking to the PWM control signal, if the components of the PWM control signal are within the threshold amount of each other, to generate an adjusted PWM control signal, and controlling the electric motor with the adjusted the PWM signal to limit parasitic effects.

19 Claims, 7 Drawing Sheets

(56) References Cited

U.S. PATENT DOCUMENTS

| | | | |
|---|---|---|---|
| 2015/0188463 A1* | 7/2015 | Soh | H02P 6/28 |
| | | | 318/400.13 |
| 2015/0349772 A1* | 12/2015 | Schubert | H03K 17/04123 |
| | | | 327/427 |
| 2017/0274776 A1* | 9/2017 | Xu | B60L 11/02 |

* cited by examiner

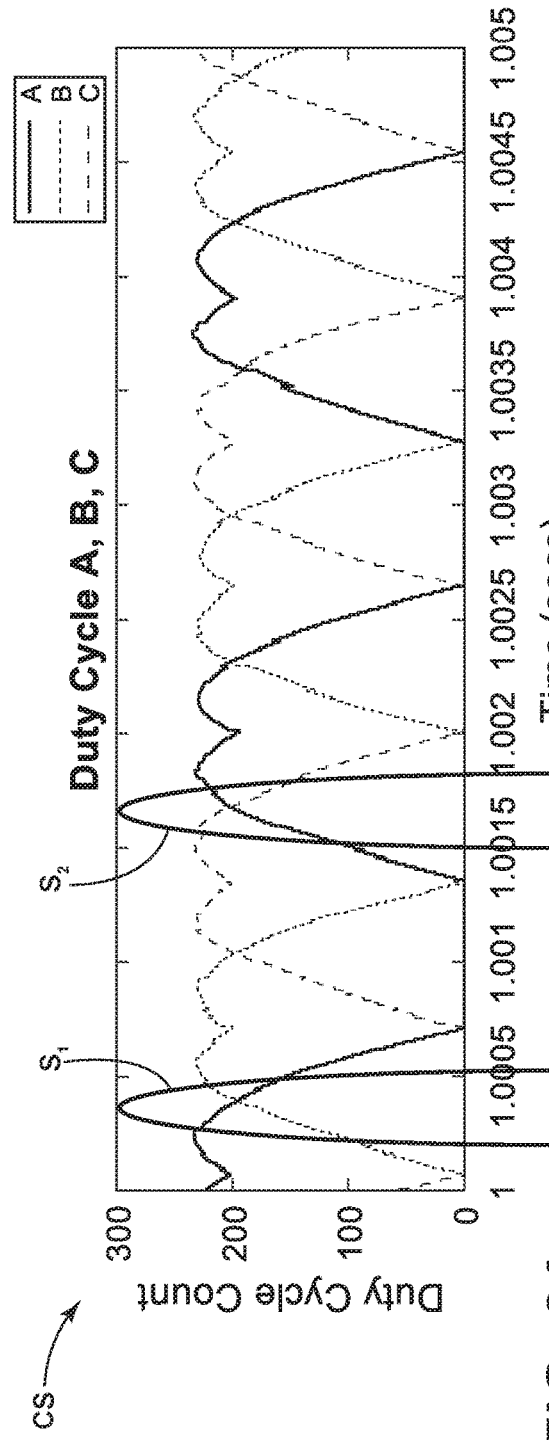
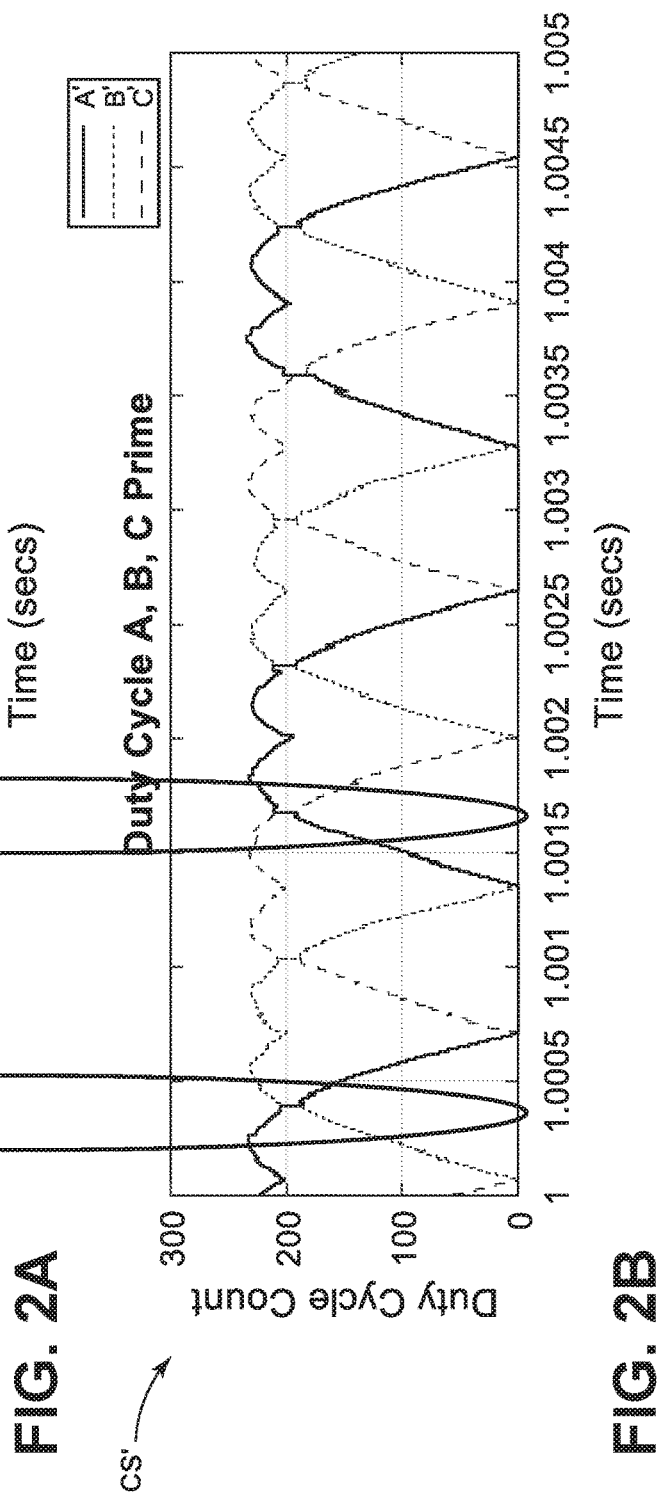
FIG. 2A
FIG. 2B

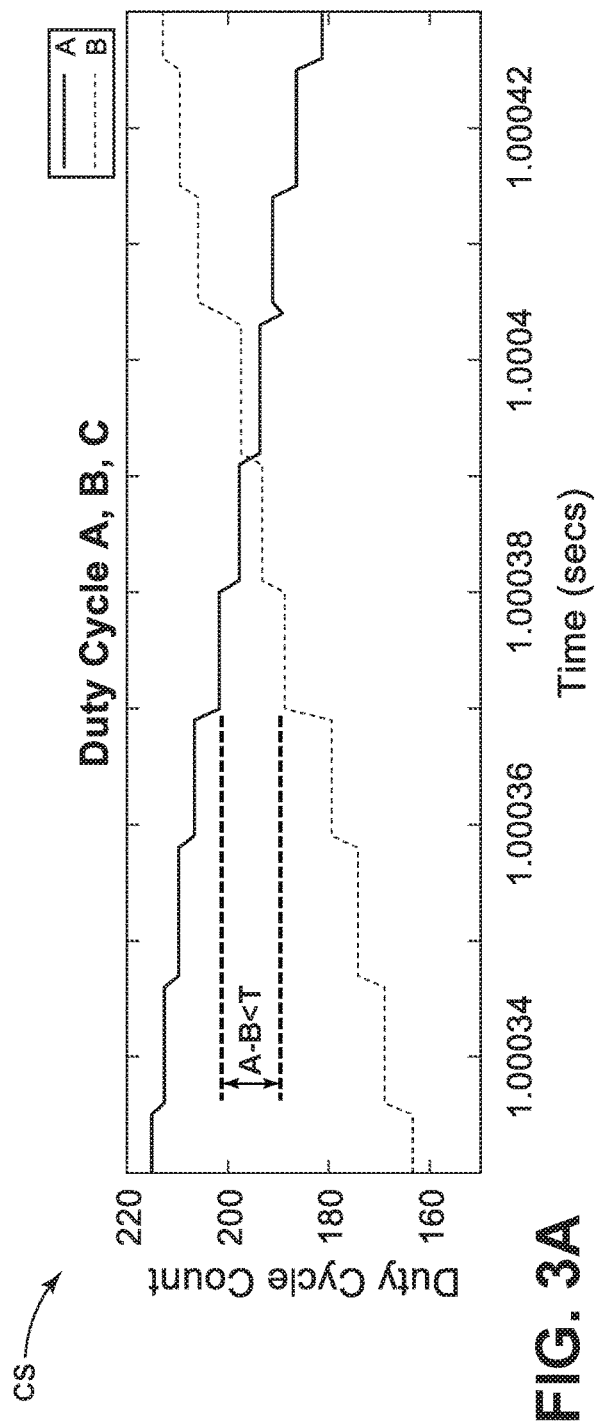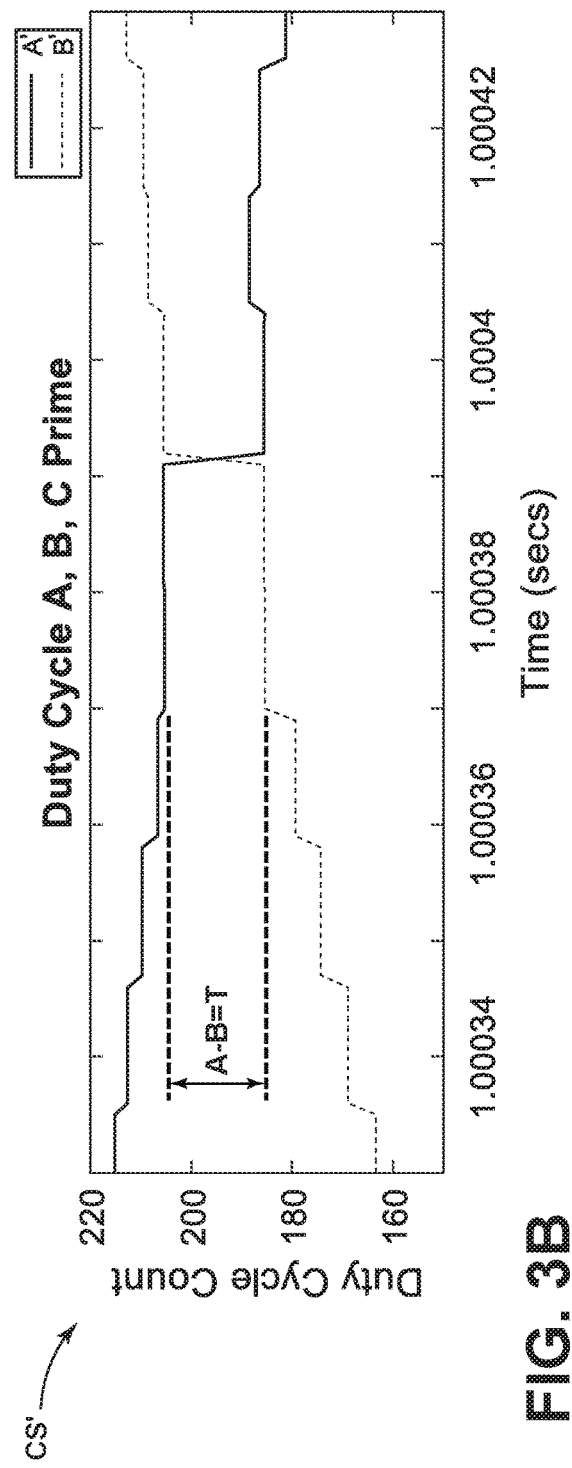
FIG. 3A
FIG. 3B

MOTOR CONTROL SYSTEM, CONTROLLER, AND METHOD

TECHNICAL FIELD

The present disclosure generally relates to control systems, electric motors, and controllers, including methods of controlling three-phase electric motors.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some designs, parasitic inductance or impedance may affect performance of power components.

There is a desire for solutions/options that minimize or eliminate one or more challenges or shortcomings of controllers and methods of controlling electrical components, such as motors. The foregoing discussion is intended only to illustrate examples of the present field and should not be taken as a disavowal of scope.

SUMMARY

In embodiments, a method of controlling an electric motor may include determining a pulse width modulation (PWM) control signal, analyzing the PWM control signal to determine if components of the PWM signal are within a threshold amount of each other, applying duty-cycle blanking to the PWM control signal, if the components of the PWM control signal are within the threshold amount of each other, to generate an adjusted PWM control signal, and/or controlling the electric motor with the adjusted PWM signal to limit parasitic effects.

With embodiments, a control system may include a plurality of switches configured to electrically connect a power source with an electrical component and/or an electronic controller. The controller may be configured to receive one or more inputs, generate a control signal, according to the one or more inputs, for controlling the plurality of switches, analyze the control signal to determine if components of the control signal are within a threshold amount of each other, adjust the control signal, if the components are within the threshold amount, to produce an adjusted control signal, and/or control the plurality of switches via the adjusted control signal to limit parasitic effects.

In embodiments, a non-transitory computer readable storage medium may store instructions, which when executed by a processor of an electronic controller, may cause the electronic controller to receive one or more inputs, generate a control signal for controlling an electrical component according to the one or more inputs, analyze the control signal to determine if two components of the control signal are within a threshold amount of each other, adjust the control signal, if the two components are within the threshold amount, to produce an adjusted control signal, and/or control a plurality of electrical switches via the adjusted control signal to limit parasitic effects.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 2A is a graphical representation of an unadjusted control signal of an embodiment of a control system according to teachings of the present disclosure.

FIG. 2B is a graphical representation of an adjusted control signal of an embodiment of a control system according to teachings of the present disclosure.

FIG. 3A is an enlarged view of a first section of the graphical representation of FIG. 2A.

FIG. 3B is an enlarged view of a first section of the graphical representation of FIG. 2B.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
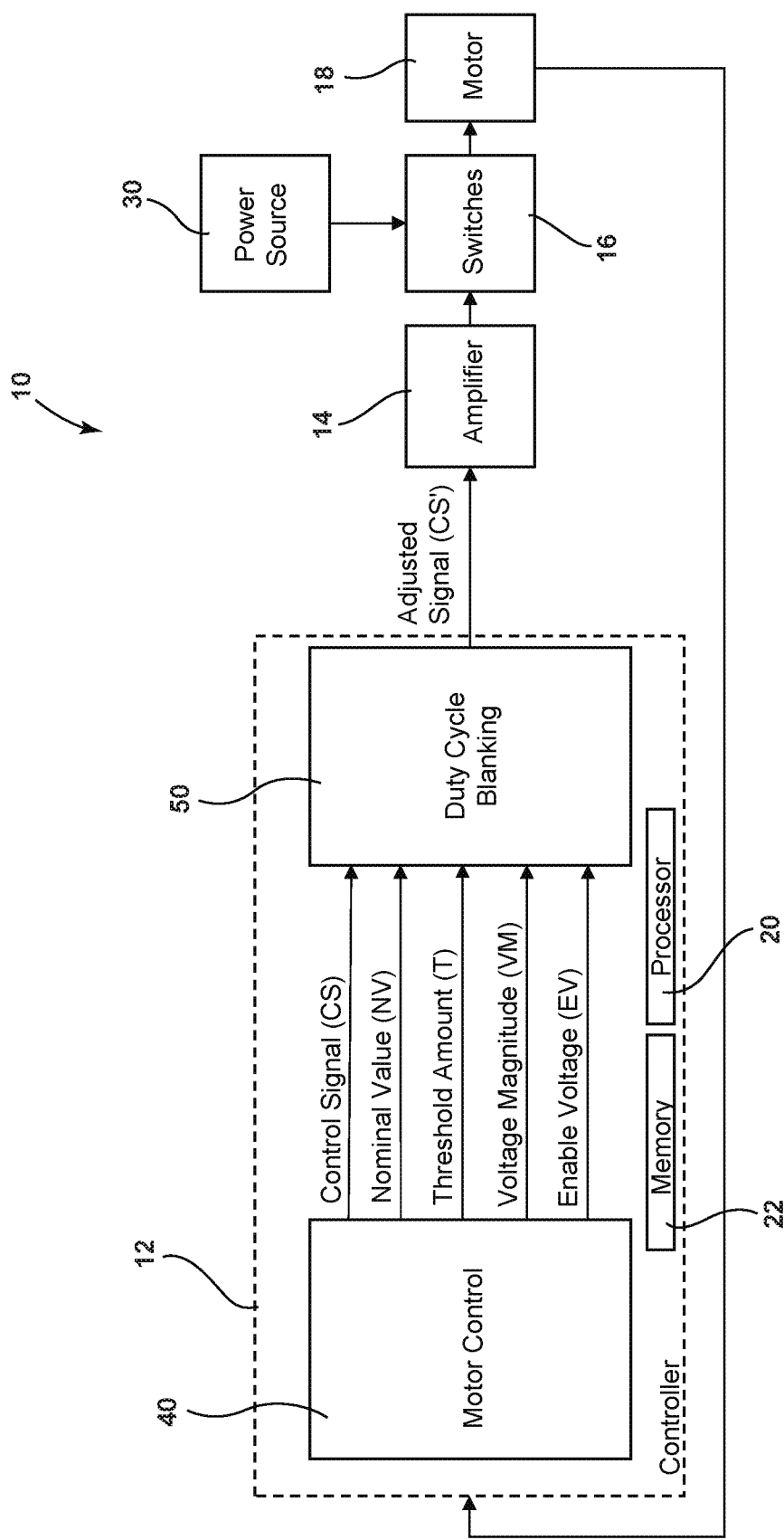
FIG. 1 is a schematic view generally illustrating an embodiment of a control system according to teachings of the present disclosure.

In embodiments, such as generally illustrated in FIG. 1, a control system 10 may include a controller 12, an amplifier 14, one or more switches 16, and/or an electrical component 18. With embodiments, controller 12 may be configured to control operation of electrical component 18. An electrical component 18 may include, for example and without limitation, an electric motor, such as a three-phase alternating current (AC) motor and/or a motor with more than three phases.

In embodiments, a controller 12 may include an electronic controller and/or include an electronic processor 20, such as a programmable microprocessor and/or microcontroller. In embodiments, controller 12 may include, for example, an application specific integrated circuit (ASIC). Controller 12 may include a central processing unit (CPU), a memory 22, and/or an input/output (I/O) interface. Controller 12 may be configured to perform various functions, including those described in greater detail herein, with appropriate programming instructions and/or code embodied in software, hardware, and/or other media. In embodiments, controller 12 may include a plurality of controllers. In embodiments, controller 12 may be connected to a display, such as a touchscreen display.

With embodiments, a controller 12 may be configured to generate one or more control signals CS that may control operation of electrical component 18. For example and without limitation, controller 12 may provide (e.g., determine, generate, etc.) pulse width modulation (PWM) control signals CS, which may include control signal components A, B, and C, such as generally illustrated in FIG. 2A. Signal components A, B, C may be referred to as "signal components," "components," or "phases" of PWM control signal CS. The three control signal components A, B, C may be provided to an amplifier 14. Amplified versions of signal components A, B, C may be provided to one or more switches 16 (e.g., electrical switches) and may control operation of the one or more switches 16. Switches 16 may be connected to a power source 30 and may selectively provide an electrical connection between power source 30 and electrical component 18. Controlling switches 16 may control power provided by power source 30 to electrical component 18, such as a magnitude and/or duration of the power. Controller 12 may be configured to receive one or more inputs, such as a speed demand, a torque demand, a current speed, and/or a current torque, among others. Controller 12 may generate control signals CS according to one or more of such inputs.

In embodiments, controller 12 may include a motor control module 40 that may be stored on a memory 22 of controller 12 and may include instructions, which when executed by a processor 20 of controller 12, may cause controller 12 to conduct one or more of the actions of function described herein, such as, for example and without limitation, generating a control signal CS that may include control signal components A, B, C.

With embodiments, a plurality of switches 16 may include six switches. For example and without limitation, the plurality of switches 16 may include a first switch (switch A upper), a second switch (switch A lower in FIGS. 5 and 6), a third switch (switch B upper), a fourth switch (switch B lower), a fifth switch (switch C upper), and/or a sixth switch (switch C lower). A first set of switches may include switch A upper and switch A lower. A second set of switches may include switch B upper and switch B lower. A third set of switches may include switch C upper and switch C lower. Sets of upper and lower switches may be controlled such that an upper switch of a set and a lower switch of a set are always in or transitioning to opposite states from each other. For example and without limitation, switch A upper may always be closed when switch A lower is open. With embodiments, signal component A may be configured to control switch A upper, an inverse of signal component A may be configured to control switch A lower, signal component B may be configured to control switch B upper, an inverse of signal component B may be configured to control switch B lower, signal component C may be configured to control switch C upper, and/or an inverse of signal component C may be configured to control switch C lower.

In embodiments, controlling switches 16 may include causing switches to open and close at various frequencies, which may range, for example and without limitation, from several Hertz, to several or many Kilohertz, to several or many Megahertz, or to greater or lower frequencies. Opening and/or closing switches 16 may be affected by parasitic effects, such as effects that may be caused by parasitic inductance and/or impedance. Parasitic effects may affect performance of switches 16 and/or of a controlled electrical component 18. For example and without limitation, parasitic effects may cause one or more switches 16 to fail to operate as desired and/or as dictated by a corresponding control signal CS (e.g., one or more switches 16 may latch). Switches disposed in close proximity to each other may be more susceptible to negative effects of parasitic effects. In some circumstances, switches 16 may be packaged close together to limit a size and/or weight of a control system 10 and/or for packaging considerations.

With embodiments, a controller 12 may be configured to limit the impact of parasitic effects that may affect switching of switches 16. For example and without limitation, controller 12 may be configured to apply duty cycle blanking to control signals CS to limit parasitic effects, such as via a duty cycle blanking module 50 that may be stored on a memory 22 of controller 12. Parasitic effects may be exacerbated if two or more control signal components are too similar to each other. Two control signal components may be too similar if they differ by less than a threshold amount T. If the duty cycles of both control signal components are aligned or nearly aligned with each other (e.g., differ by less than threshold amount T), two corresponding switches 16 may both transition from a first state (e.g., an on state) to a second state (e.g., an off state) at substantially the same time. For example and without limitation, threshold amount T may correspond to about 2% of a period of one or both of the control signal components (e.g., duty cycles or duty cycle counts of the components differing by about 2% of each other). With embodiments, an example period of a control signal CS may be about a few microseconds.

In embodiments, a motor control module 40 may be configured to generate a control signal CS (e.g., with components A, B, C) and a duty cycle blanking module 50 may be configured to analyze components A, B, C of control signal CS. For example and without limitation, motor control module 40 may output control signal components A, B, C (and/or duty cycles therefor), a nominal value NV, a threshold amount T, a voltage magnitude VM, and/or an enable voltage EV. Duty cycle blanking module 50 may be configured to receive one or more of the outputs of motor control module 40. Controller 12 and/or duty cycle blanking module 50 may be configured to determine if components A, B, C, of a control signal CS differ by a threshold amount T. A threshold amount T may include a time difference, a phase difference, and/or a duty cycle or duty cycle count difference. Controller 12 may be configured to work with duty cycle values in terms of a number duty cycle counts relative to a total number of duty cycle counts per period. For example and without limitation, a total number of duty cycle counts in a period may be 350 duty cycle counts.

With embodiments, a duty cycle blanking module 50 may first determine if a control signal component A, B, C is at or about nominal value NV. A nominal value NV may, for example and without limitation, include a maximum value (e.g., 100% or 350 duty cycle counts), a minimum value (e.g., 0% or 0 duty cycle counts), and/or a range of values. A signal component at or about a nominal value NV may not be expected to include a duty cycle or duty cycle count similar to another signal component. Controller 12 may determine that such a signal component is unlikely to be materially affected by parasitic effects and/or does not need to be adjusted (e.g., signal component C in section $S_1$ and signal component A in section $S_2$ of FIG. 2A). If controller 12 determines that a signal component does not need to be adjusted, controller 12 may determine that at least one of the other signal components should be evaluated for adjustment. For example and without limitation, at a first time, controller 12 may determine that third signal component C may not need to be adjusted and that one or both of first signal component A and second signal component B should be evaluated for adjustment (see, e.g., section $S_1$ of FIG. 2A). Additionally or alternatively, at a second time, controller 12 may determine that second signal component B may not need to be adjusted and that one or both of first signal component A and third signal component C should be evaluated for adjustment (see, e.g., section $S_2$ of FIG. 2B).

In embodiments, if none of the components A, B, C of a control signal CS are at or about a nominal value NV, duty cycle blanking module 50 may be configured to determine that none of components A, B, C need to be adjusted and that controller 12 should control switches 16 and/or electrical component 18 with control signal CS generated/determined by motor control module 40 (e.g., the original control signal).

With embodiments, a duty cycle blanking module 50 may be configured to evaluate control signal components A, B, C for adjustment (e.g., if duty cycle module 50 previously determined that such components should be evaluated). Evaluating control signal components A, B, C may include comparing a difference between the control signal components to a threshold amount T. A threshold amount T may correspond to a minimum or desired difference in duty cycle, time, and/or phase between control signal components that is unlikely to result in significant parasitic effects. A threshold amount T may, for example and without limitation, be about 2%. If the difference between the two signal components is greater than or equal to the threshold amount T, duty cycle blanking module 50 may not adjust either of the two signal components. If the difference is less than threshold amount T and the sum of the two signal components is greater than or equal to the threshold amount T, duty cycle blanking module 50 may determine that both signal components should be adjusted. If the difference is less than threshold amount T and the sum of the two signal components is less than threshold amount T, duty cycle blanking module 50 may not adjust either of the two signal components.

In embodiments, a duty cycle blanking module 50 may be configured to adjust or modify one or more signal components A, B, C of an original control signal CS that may be determined/generated via a motor control module 40. With embodiments, duty cycle blanking module 50 may be configured to advance and/or delay a signal component such that it is not too similar to another component and/or to limit parasitic effects.

With embodiments, a duty cycle blanking module 50 may be configured to make adjustments such that the difference between the two similar components is equal or substantially equal to a threshold amount T. If the difference between the components is increased too much (e.g., significantly more than threshold amount T), performance of the electrical component may be negatively affected.

In embodiments, a duty cycle blanking module 50 may delay the larger of the two components (e.g., the signal component with the larger duty cycle). For example and without limitation, an adjusted version of the larger signal component may be equal to the sum of the two signal components plus the threshold amount T, all divided by two. Duty cycle blanking module 50 may advance the smaller of the two signal components (e.g., the signal component with the smaller duty cycle). For example and without limitation, an adjusted version of the smaller signal component may be equal to the sum of the two signal components less the threshold amount T, all divided by two.

An example of adjustments of control signal components is generally illustrated in FIGS. 2A and 2B (section $S_1$) and in the corresponding enlarged views of FIGS. 3A, and 3B. Duty cycle blanking module 50 may be configured to advance signal component B (e.g., by at least temporarily reducing the duty cycle or duty cycle count of signal component B) to create signal component B' and/or duty cycle blanking module 50 may be configured to delay signal component A (e.g., by at least temporarily increasing the duty cycle or duty cycle count of signal component A) to create a signal component A'. Signal component C' may be the same as signal component C in section $S_1$.

Figure 4A:
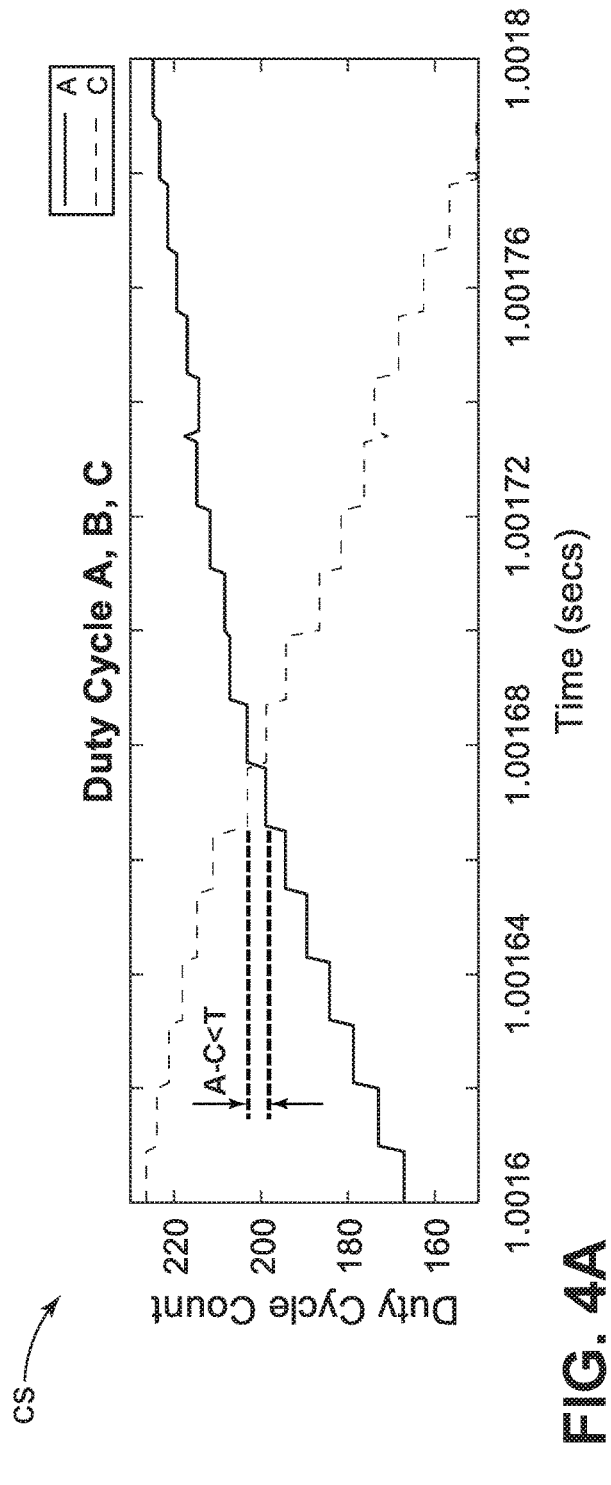
FIG. 4A is an enlarged view of a second section of the graphical representation of FIG. 2A.
Figure 4B:
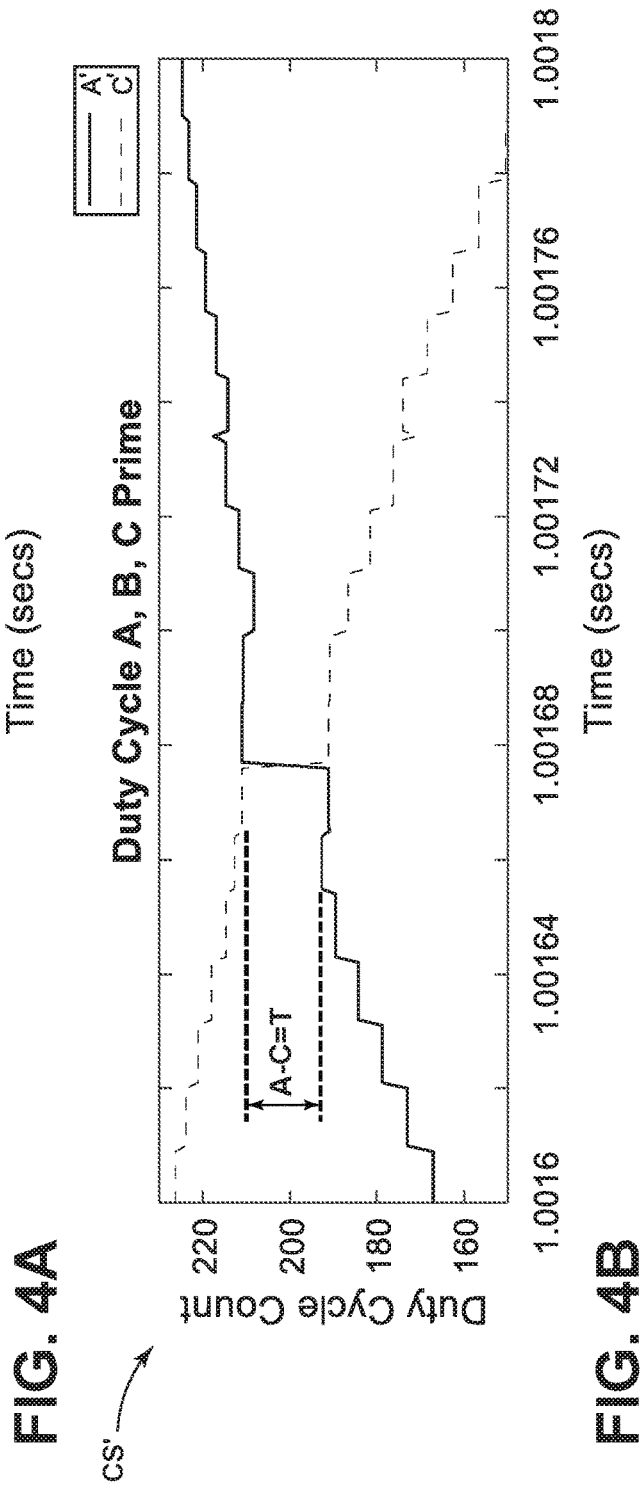
FIG. 4B is an enlarged view of a second section of the graphical representation of FIG. 2B.

Additionally or alternatively, such as generally illustrated in FIGS. 2A and 2B (section $S_2$) and in the corresponding enlarged views of FIGS. 4A, and 4B, a duty cycle blanking module 50 may be configured to advance signal component A (e.g., by at least temporarily reducing the duty cycle or duty cycle count of component A) to create signal component A' and/or controller may be configured to delay component C (e.g., by at least temporarily increasing the duty cycle or duty cycle count of component C) to create a signal component C'. Signal component B' may be the same as signal component B in section $S_2$.

Figure 5:
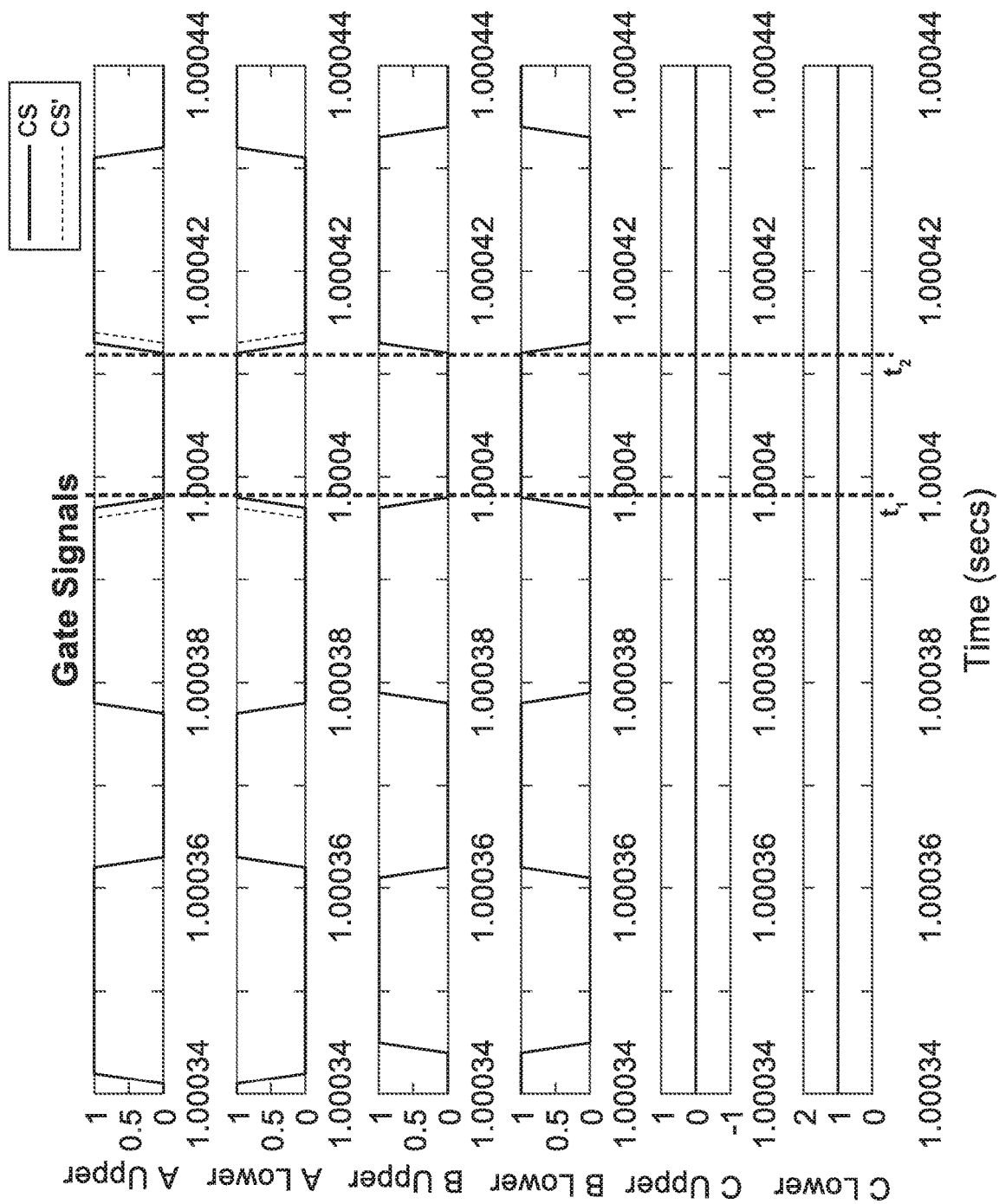
FIG. 5 is a graphical representation of control signals provided to switches of an embodiment of a control system according to teachings of the present disclosure.

With embodiments, a duty cycle blanking module 50 may be configured to generate an adjusted control signal CS' that may include three signal components (e.g., signal components A', B', C'). At least one of the components may be unadjusted relative to a corresponding component of the original control signal CS. At least one of the other two components of adjusted control signal CS' may be an adjusted version of the corresponding component (e.g., A, B, C) of original control signal CS. For example and without limitation, an adjusted control signal CS' for section $S_1$ may include signal components A', B', C', where one or both of signal components A' and B' are adjusted, and signal component C' is unadjusted (e.g., equal to signal component C). A resulting change in the control/gate signals provided to switches 16 is generally illustrated in FIG. 5. As generally shown, if controlled via original control signal CS, switch A upper and switch B upper may have been closed and opened at substantially the same time, which may have increased parasitic effects (see, e.g., times, $t_1$, $t_2$). Controlling switch A upper and switch B upper with signal components A', B' of adjusted control signal CS' may result in switch A upper closing before and/or opening after switch B upper, which may limit and/or reduce parasitic effects.

Figure 6:
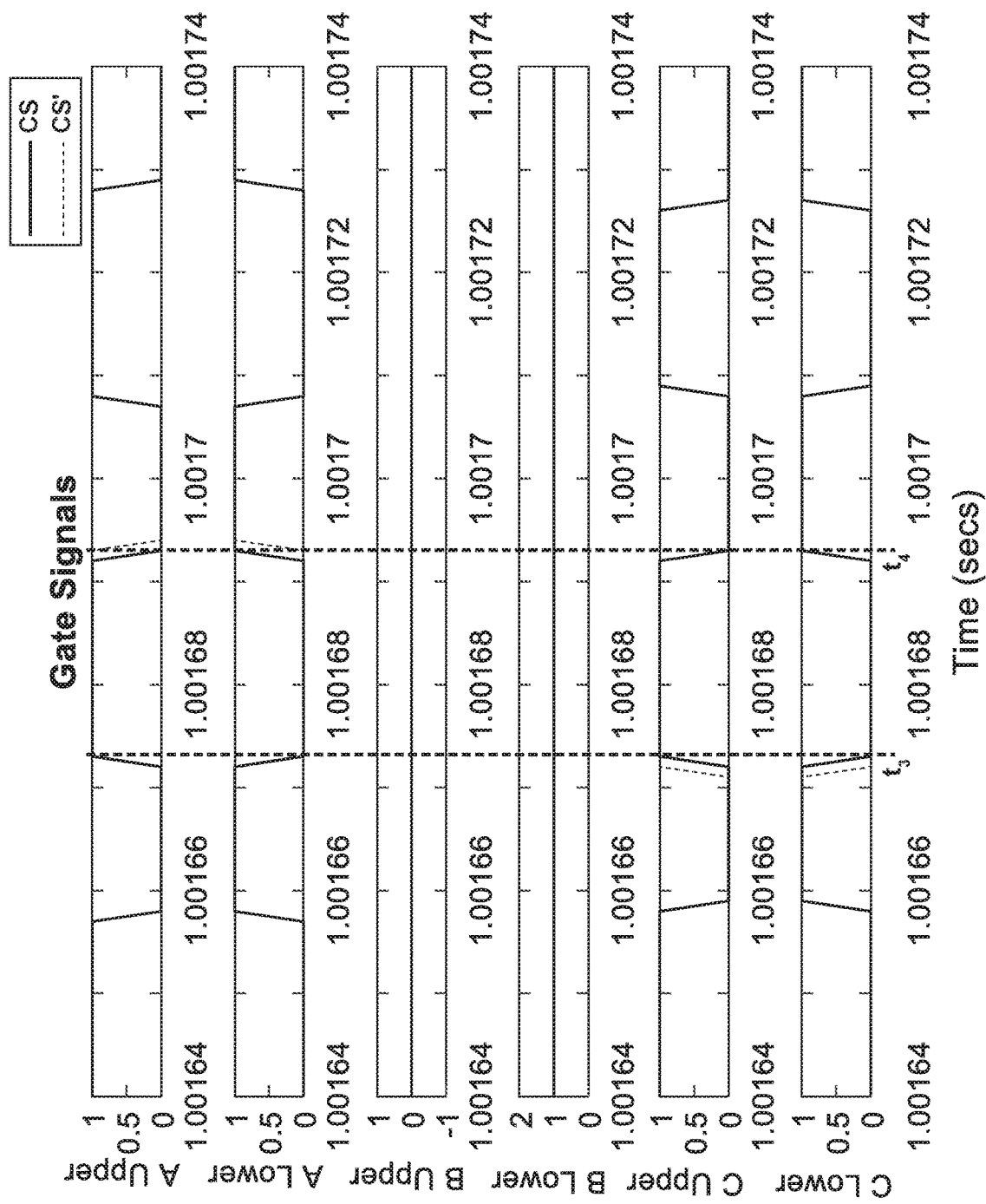
FIG. 6 is a graphical representation of control signals provided to switches of an embodiment of a control system according to teachings of the present disclosure.

Additionally or alternatively, in embodiments, an adjusted control signal CS' for section $S_2$ may include signal components A', B', C', where one or both signal components A' and C' are adjusted, and signal component B' is unadjusted. A resulting change in the control/gate signals provided to switches is generally illustrated in FIG. 6. As generally shown, if controlled via original control signal CS (e.g., signal components A, C), switch A upper and switch C upper may have been closed and opened at substantially the same time, which may have increased parasitic effects (see, e.g., times, $t_3$, $t_4$). Controlling switch A lower and switch C lower with signal components A' and C', respectively, of adjusted control signal CS' may result in switch C lower closing before switch A lower and/or switch A lower opening after switch C lower, which may limit and/or reduce parasitic effects.

With embodiments, a duty cycle blanking module 50 may apply duty cycle blanking if a voltage magnitude VM from motor control module 40 is at least as great as an enable voltage EV and controller 12 may not apply duty cycle blanking (e.g., may not activate duty cycle blanking module) if voltage magnitude VM is less than enable voltage EV. Unless voltage magnitude VM is greater than enable voltage EV, duty cycle blanking module 50 may not be active and the control signal(s) CS generated by motor control module 40 may be utilized to control electrical component 18 without adjustment (e.g., original control signal components A, B, C may be utilized to control switches 16). An enable voltage EV may, for example and without limitation, be a variable percentage of a maximum control voltage (e.g., about 10%) that may be used for controlling electrical component 18 (e.g., an enable voltage associated with a 350 V motor may be about 35 V).

Figure 7:
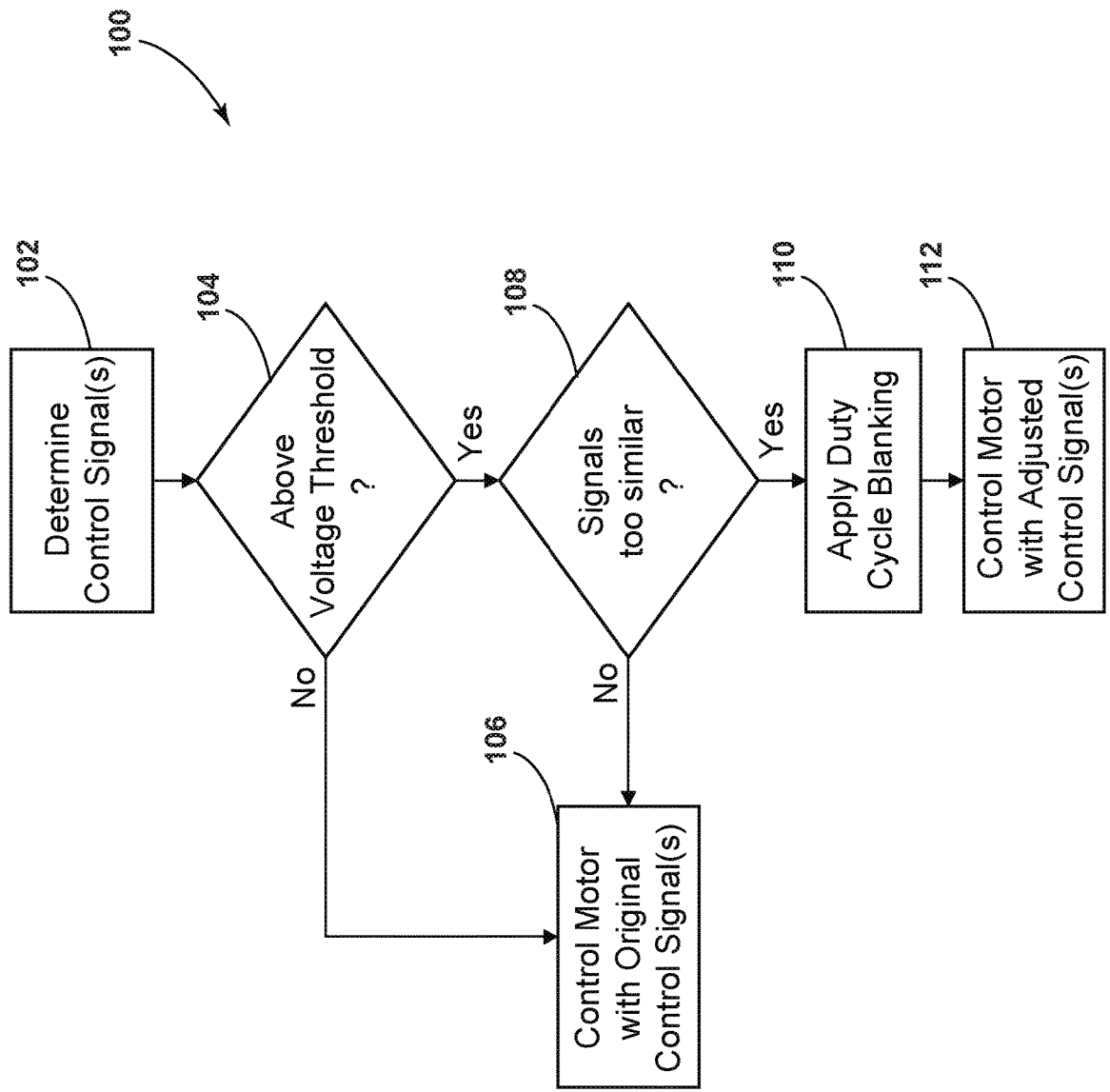
FIG. 7 is a flow diagram generally illustrating an embodiment of a method of controlling an electrical component according to teachings of the present disclosure.

In embodiments, such as generally illustrated in FIG. 7, a method 100 of controlling an electric motor may include electronic controller 12 determining a control signal CS (e.g., a PWM control signal), such as via a motor control module 40 stored on a memory 22 of and implemented via an electronic processor 20 of electronic controller 12 (step 102). Method 100 may include determining if a voltage magnitude VM of control signal CS is greater than an enable voltage EV (step 104). If voltage magnitude VM is not greater than enable voltage EV, electronic controller 12 may control electrical component 18 according to control signal CS (step 106). If voltage magnitude VM is at least as great as enable voltage EV, controller 12 may activate a duty cycle blanking module. If duty cycle blanking module is activated, method 100 may include analyzing control signal CS to determine if components of control signal CS are within a threshold amount T of each other, such as via duty cycling blanking module (step 108). If components of control signal CS differ by more than threshold amount T, controller 12 may control electrical component 18 with original control signal CS. Method 100 may include applying duty-cycle blanking (e.g., via duty cycling blanking module 50) to control signal CS, if the components of control signal CS differ by less than threshold amount T, to generate an adjusted control signal CS' (step 110). Method 100 may include controller 12 controlling electric component 18 with adjusted control signal CS' to limit parasitic effects (step 112).

In embodiments, duty cycle blanking 110 may include one or both of delaying and advancing at least one of components of a control signal CS. A control signal CS may include a first component A, a second component B, and/or a third component C. Analyzing control signal CS (step 108) may include comparing at least one of first signal component A, second signal component B, and third signal component C to a nominal value NV (e.g., a minimum and/or a maximum). Analyzing control signal CS may include determining that one of first signal component A, second signal component B, the third signal component C is equal or substantially equal to nominal value NV, that said signal component does not need to be adjusted, and/or that at least one other signal component should be evaluated for adjustment. The at least one other signal component may include both other signal components (e.g., controller 12 may determine that both other signal components should be evaluated for adjustment). Duty cycle blanking 110 may include adjusting the least one other signal component and/or generating an adjusted control signal CS' that may include a first signal component A', a second signal component B', and/or a third signal component C'. Adjusting at least one other signal component may include one or both of delaying at least one other signal component and advancing the at least one other signal component. If none of original control signal components A, B, C are equal or substantially equal to nominal value NV, controller may utilize original control signal CS to control switches 16 and/or electrical component 18 (step 106).

In embodiments, controlling an electric component 18 (e.g., a motor) may include controlling operation of a plurality of electrical switches 16 configured to selectively provide an electrical connection between a power source 30 and an electric component 18. Electrical switches 16 may include a first set of switches, a second set of switches, and/or a third set of switches. A first signal component A, A' of original and adjusted control signals CS, CS' may be configured for controlling the first set of switches, a second signal component B, B' of original and adjusted control signals CS, CS' may be configured for controlling the second set of switches, and/or a third signal component C, C' of original and adjusted control signals CS, CS' may be configured for controlling the third set of switches. Controlling operation of electrical switches 16 may include restricting or limiting parasitic effects. Restricting or limiting parasitic effects may include operating the plurality of switches 16 such that certain switches (e.g., adjacent switches or switches disposed in close proximity to each other) do not close at substantially the same time or open at substantially the same time. The certain switches may be from different sets of switches. With embodiments, a threshold amount T for determining if signal components A, B, C of a control signal CS are too similar may correspond to about 2% of a period of control signal CS (e.g., if duty cycles of two control signal components are within 2% of each other). In embodiments, a control system 10 may be configured for use in connection with more than three phases (e.g., motors with more than three phases) and may include a set of switches 16 for each phase.

In embodiments, a control system 10 may be configured for limiting the effect of parasitic effects on switching of electrical switches 16 (e.g., high frequency switching). A control system may include an electronic controller 12 that may include a processor 20, a memory 22, a motor control module 40 stored on the memory 22, and/or a duty cycle blanking module 50 stored on the memory 22. Motor control module 40 and/or duty blanking module 50 may include instructions that may be executed by processor 20. Motor control module 40 may include instructions or code that, when executed by processor 20, may cause controller 12 to receive a plurality of inputs and to generate a control signal CS for controlling an electrical component 18 according to the plurality of inputs. Duty cycle blanking module 50 may include instructions or code that, when executed by processor 20, may cause controller 12 to receive control signal CS from control module 40, and adjust control signal CS to produce an adjusted control signal CS' to limit parasitic effects.

It should be understood that actions or functions that may be described in connection with motor control module 40 or duty cycle blanking module 50 may be carried out by controller 12 (e.g., controller 12 may be configured to carry out such actions or functions). It should also be understood that while a feedback loop is generally illustrated in FIG. 1, embodiments of the present disclosure may or may not include such a feedback loop and duty cycle blanking may or may not involve feedback data.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

It should be understood that a controller a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of controlling an electric motor, the method comprising:
    determining a PWM (pulse width modulation) control signal;
    analyzing the PWM control signal to determine if duty-cycle components of the PWM control signal are within a threshold amount of each other;
    applying duty-cycle blanking to the PWM control signal, if the duty-cycle components of the PWM control signal are within the threshold amount of each other, to generate an adjusted PWM control signal; and
    controlling the electric motor with the adjusted PWM control signal to limit parasitic effects;
    wherein the PWM control signal includes a first duty-cycle component and a second duty-cycle component;
    wherein the first duty-cycle component includes a smaller duty cycle than the second duty-cycle component;
    wherein applying duty-cycle blanking includes advancing the first duty-cycle component by a first amount corresponding to half of a total of the first duty-cycle component added with the second duty-cycle component less the threshold amount, to generate an adjusted first duty-cycle component of the adjusted PWM control signal; and
    wherein applying duty-cycle blanking includes delaying the second duty-cycle component by a second amount corresponding to half of a total of the first duty-cycle component added with the second duty-cycle component plus the threshold amount, to generate an adjusted second duty-cycle component of the adjusted PWM control signal.

2. The method of claim 1, wherein duty-cycle blanking is applied to the PWM control signal only if the PWM control signal includes a voltage above a threshold voltage; and the threshold voltage is a variable percentage of a maximum control voltage.

3. The method of claim 1, wherein duty cycle blanking includes one or both of delaying and advancing at least one of the duty-cycle components of the PWM control signal.

4. The method of claim 1, wherein the duty-cycle components of the PWM control signal include a third duty-cycle component.

5. The method of claim 4, wherein analyzing the PWM control signal includes:
    comparing at least one of the first duty-cycle component, the second duty-cycle component, and the third duty-cycle component to a nominal value; and determining that one of the first duty-cycle component, the second duty-cycle component, and the third duty-cycle component is substantially equal to the nominal value, is not expected to be materially affected by parasitic effects, and does not need to be adjusted; and determining that at least one other duty-cycle component needs to be adjusted if the at least one other duty-cycle component is not substantially equal to the nominal value.

6. The method of claim 5, wherein the at least one other duty-cycle component includes two components.

7. The method of claim 5, wherein duty cycle blanking includes adjusting the at least one other duty-cycle component.

8. The method of claim 7, wherein adjusting the at least one other duty-cycle component includes one or both of delaying the at least one other duty-cycle component and advancing the at least one other duty-cycle component.

9. The method of claim 1, wherein controlling the electric motor with the adjusted PWM control signal to limit parasitic effects includes controlling operation of a plurality of electrical switches configured to selectively provide an electric connection between a power source and the electric motor.

10. The method of claim 9, wherein the plurality of electrical switches includes a first set of switches, a second set of switches, and a third set of switches; and the first duty-cycle component of the adjusted PWM control signal controls the first set of switches, the second duty-cycle component of the adjusted PWM control signal controls the second set of switches, and a third duty-cycle component of the adjusted PWM control signal controls the third set of switches.

11. The method of claim 9, wherein controlling operation of the plurality of electrical switches includes controlling the plurality of electrical switches with the adjusted PWM control signal to limit parasitic effects.

12. The method of claim 11, wherein controlling the plurality of electrical switches with the adjusted PWM control signal includes operating the plurality of electrical switches such that certain switches do not close at substantially the same time or open at substantially the same time.

13. The method of claim 1, wherein the threshold amount corresponds to about 2% of a period of the PWM control signal.

14. A control system, comprising:
a plurality of switches configured to electrically connect a power source with an electrical component; and
an electronic controller;
wherein the electronic controller is configured to:
receive one or more inputs;
generate a PWM (pulse width modulation) control signal, according to the one or more inputs, for controlling the plurality of switches;
analyze the PWM control signal to determine if components of the PWM control signal are within a threshold amount of each other;
adjust the PWM control signal, if the components are within the threshold amount, to produce an adjusted control signal; and
control the plurality of switches via the adjusted control signal to limit parasitic effects;
wherein the PWM control signal includes a first duty-cycle component and a second duty-cycle component;
wherein the first duty-cycle component includes a smaller duty cycle than the second duty-cycle component;

wherein the adjusted control signal includes applying a duty-cycle blanking advancing the first duty-cycle component by a first amount corresponding to half of a total of the first duty-cycle component added with the second duty-cycle component less the threshold amount, to generate an adjusted first duty-cycle component of the adjusted PWM control signal; and
wherein applying the duty-cycle blanking further includes delaying the second duty-cycle component by a second amount corresponding to half of a total of the first duty-cycle component added with the second duty-cycle component plus the threshold amount, to generate an adjusted second duty-cycle component of the adjusted PWM control signal.

15. The control system of claim 14, wherein the adjusted control signal includes at least one adjusted component and an unadjusted component.

16. The control system of claim 15, wherein the at least one adjusted component is one or both of delayed and advanced.

17. The control system of claim 14, wherein the electrical component includes a three-phase alternating current motor.

18. The control system of claim 14, wherein the plurality of switches includes a first switch, a second switch, a third switch, a fourth switch, a fifth switch, and a sixth switch; the adjusted control signal includes a first signal component, a second signal component, and a third signal component; the first signal component corresponds to the first switch and the second switch; the second signal component corresponds to the third switch and the fourth switch; and the third signal component corresponds to the fifth switch and the sixth switch.

19. A non-transitory computer readable storage medium storing instructions, which when executed by a processor of an electronic controller, causes the electronic controller to:
receive one or more inputs;
generate a PWM (pulse width modulation) control signal for controlling an electrical component according to the one or more inputs;
analyze the control signal to determine if two components of the control signal are within a threshold amount of each other;
adjust the control signal, if the two components are within the threshold amount, to produce an adjusted control signal; and
control a plurality of electrical switches via the adjusted control signal to limit parasitic effects;
wherein the PWM control signal includes a first duty-cycle component and a second duty-cycle component;
wherein the first duty-cycle component includes a smaller duty cycle than the second duty-cycle component;
wherein the adjusted control signal includes applying a duty-cycle blanking advancing the first duty-cycle component by a first amount corresponding to half of a total of the first duty-cycle component added with the second duty-cycle component less the threshold amount, to generate an adjusted first duty-cycle component of the adjusted PWM control signal; and
wherein applying the duty-cycle blanking further includes delaying the second duty-cycle component by a second amount corresponding to half of a total of the first duty-cycle component added with the second duty-cycle component plus the threshold amount, to generate an adjusted second duty-cycle component of the adjusted PWM control signal.

* * * * *